(12) United States Patent
Tada

(10) Patent No.: US 6,621,847 B1
(45) Date of Patent: Sep. 16, 2003

(54) NARROW-BAND EXCIMER LASER APPARATUS

(75) Inventor: Akifumi Tada, Gotenba (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 203 days.

(21) Appl. No.: 09/713,146

(22) Filed: Nov. 14, 2000

(30) Foreign Application Priority Data

Nov. 17, 1999 (JP) ............................................. 11-326952

(51) Int. Cl.$^7$ ................................................. H01S 3/22
(52) U.S. Cl. .............................. 372/57; 372/102; 372/98
(58) Field of Search ............................. 372/57, 102, 98

(56) References Cited

U.S. PATENT DOCUMENTS

| | | | | |
|---|---|---|---|---|
| 5,856,991 A | * | 1/1999 | Ershov | .......................... 372/57 |
| 6,424,666 B1 | * | 7/2002 | Stamm | .......................... 372/32 |
| 2002/0075933 A1 | * | 6/2002 | Stamm et al. | ................. 372/57 |
| 2002/0101890 A1 | * | 8/2002 | Stamm et al. | ................. 372/19 |

* cited by examiner

*Primary Examiner*—Leon Scott, Jr.
(74) *Attorney, Agent, or Firm*—Dellett & Walters

(57) ABSTRACT

An excimer laser apparatus using a bandwidth-narrowing optical system including a beam diameter-enlarging optical system and a Littrow mounting reflection type diffraction grating is made suitable for use as a laser light source for semiconductor lithography or the like by surmounting the limit to bandwidth narrowing due to wavefront distortion induced by the reflection type diffraction grating. In an excimer laser apparatus having a bandwidth-narrowing optical system including a Littrow mounting reflection type diffraction grating and a combination of a beam diameter-enlarging optical system and a slit placed on the entrance side of the reflection type diffraction grating, diffracted wavefront distortion (a measured value for He—Ne laser light) within the laser irradiation area of the reflection type diffraction grating in Littrow mounting is not more than $\lambda/10$, where $\lambda$ is a measuring wavelength.

5 Claims, 7 Drawing Sheets

P Region where wavefront distortion>λ/10

Laser irradiation area

10 Shield

NARROW-BAND EXCIMER LASER APPARATUS

BACKGROUND OF THE INVENTION

The present invention relates to narrow-band excimer laser apparatus using a diffraction grating. More particularly, the present invention relates to a narrow-band excimer laser apparatus designed to suppress the spread of the line width of generated light due to wavefront distortion induced by a diffraction grating used as a component of a bandwidth-narrowing optical system.

Vacuum ultraviolet rays of wavelength around 193.3 nm generated from excimer laser apparatus, particularly ArF excimer laser apparatus, attract attention as being a next-generation laser light source for semiconductor lithography. As optical materials usable for exposure apparatus in the vacuum ultraviolet region, however, there are only synthetic quartz and fluorite, and it is extremely difficult to achromatize the optical system of the exposure apparatus. Accordingly, it is demanded that light generated from the excimer laser apparatus have an extremely narrow bandwidth (line width) of 0.5 pm or less.

Optical systems practically usable for narrowing the band of oscillation wavelengths in excimer laser apparatus include an etalon and a Littrow mounting reflection type diffraction grating. The former requires a high degree of surface accuracy and coating. In the present state of the art, only synthetic quartz can be used to obtain a high degree of accuracy. Synthetic quarts suffers from the problem that when the laser light intensity increases, synthetic quartz cannot be used because it suffers an increase in refractive index (compaction) and a reduction in transmittance. In addition, the line width widens undesirably when the coating becomes deteriorated. In contrast, in the case of the Littrow mounting reflection type diffraction grating, the line width is determined by the diameter of a beam incident on the reflection type diffraction grating. Therefore, the reflection type diffraction grating is used in combination with a beam diameter-enlarging optical system comprising a deviation prism or some deviation prisms. In this case, even when the prism becomes deteriorated, the beam diameter magnifying power does not change, and even when the reflecting surface of the reflection type diffraction grating becomes deteriorated, the groove pitch does not change. Therefore, there is no influence on the line width.

However, it has heretofore been impossible to narrow the bandwidth (line width) down to the desired levels by using a bandwidth-narrowing optical system including a beam diameter-enlarging prism or some beam diameter-enlarging prisms and a Littrow mounting reflection type diffraction grating as stated above; the narrowest possible bandwidth (line width) obtained with the conventional bandwidth-narrowing optical system is of the order of 0.6 pm. The reason for this is that wavefront distortion (i.e. the depth from the crest to the trough of the wavefront) induced by the diffraction grating is $\lambda/5$ or more (a measured value for He—Ne laser light), whereas wavefront distortion induced by an optical element (a prism, an output mirror, or a window) other than the diffraction grating is $\lambda/10$ or less (a measured value for He—Ne laser light).

In theory, wavelength resolution becomes higher as the angle of incidence on the reflection type diffraction grating is increased by increasing the blaze angle of the diffraction grating. However, if the blaze angle is increased in excess of 76° to obtain a higher resolution, the surface finishing accuracy required for the grating grooves, on which incident light impinges normally in Littrow mounting, becomes higher. Actually, it is difficult to produce a reflection type diffraction grating of minimal variations in surface finish. Therefore, wavefront distortion due to the variations increases, making it impossible to narrow the bandwidth down to the order of 0.6 pm or less.

SUMMARY OF THE INVENTION

The present invention was made in view of the above-described problems with the prior art. Accordingly, an object of the present invention is to provide an excimer laser apparatus using a bandwidth-narrowing optical system including a beam diameter-enlarging system and a Littrow mounting reflection type diffraction grating. The excimer laser apparatus is made suitable for use as a laser light source for semiconductor lithography or the like by surmounting the limit to bandwidth narrowing due to wavefront distortion induced by the reflection type diffraction grating.

To attain the above-described object, the present invention provides a narrow-band excimer laser apparatus having a bandwidth-narrowing optical system including a Littrow mounting reflection type diffraction grating. The bandwidth-narrowing optical system further includes a beam diameter-enlarging optical system and a slit that are placed on the entrance side of the reflection type diffraction grating.

In the narrow-band excimer laser apparatus, diffracted wavefront distortion (a measured value for He—Ne laser light) within the laser irradiation area of the reflection type diffraction grating in Littrow mounting is not more than $\lambda/10$, where $\lambda$ is a measuring wavelength.

In addition, the present invention provides a narrow-band excimer laser apparatus having a bandwidth-narrowing optical system including a Littrow mounting reflection type diffraction grating. The bandwidth-narrowing optical system further includes a beam diameter-enlarging optical system and a slit that are placed on the entrance side of the reflection type diffraction grating.

In the narrow-band excimer laser apparatus, a light-blocking device is placed between the reflection type diffraction grating and the slit to prevent laser light from being applied to a portion of the laser irradiation area of the reflection type diffraction grating at which diffracted wavefront distortion (a measured value for He—Ne laser light) in Littrow mounting is more than $\lambda/10$, where $\lambda$ is a measuring wavelength.

It is desirable in the above-described narrow-band excimer laser apparatus that the number of grooves of the reflection type diffraction grating should be in the range of from 80 to 150 per millimeter.

Furthermore, it is desirable that the blaze angle of the reflection type diffraction grating should be not less than 76°.

In the present invention, diffracted wavefront distortion within the laser irradiation area of the reflection type diffraction grating in Littrow mounting is not more than $\lambda/10$. Alternatively, a light-blocking device is placed between the reflection type diffraction grating and the slit to prevent laser light from being applied to a portion of the laser irradiation area of the reflection type diffraction grating at which diffracted wavefront distortion is more than $\lambda/10$. Accordingly, the line width of generated laser light can be made extremely narrow, i.e. 0.5 pm or less. Thus, it is possible to realize a narrow-band excimer laser apparatus satisfactorily usable as a laser light source for semiconductor lithography or the like.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

The narrow-band excimer laser apparatus according to the present invention will be described below by way of an embodiment.

Figure 1:
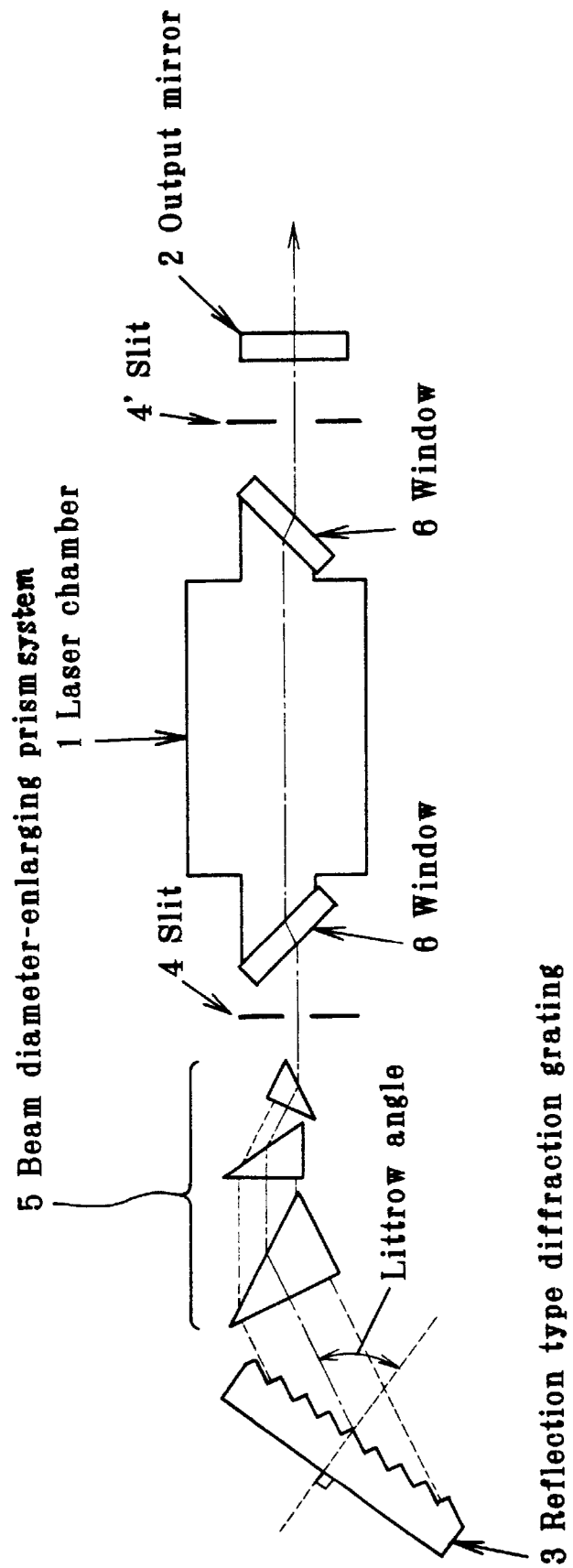
FIG. 1 is a diagram showing an optical arrangement of an excimer laser apparatus to which the present invention is directed.

FIG. 1 shows an optical arrangement of an excimer laser apparatus using a bandwidth-narrowing optical system including a beam diameter-enlarging prism or some beam diameter-enlarging prisms and a Littrow mounting reflection type diffraction grating. In FIG. 1, a pumping system, a control system, etc. are not shown. In the case of an ArF excimer laser apparatus, argon gas and fluorine gas are sealed in a laser chamber 1 as a laser medium, together with a buffer gas. In addition, the laser chamber 1 contains main discharge electrodes for pumping, preionization electrodes, and a gas circulating system. The laser chamber 1 is placed in an optical resonator formed by an output mirror 2 and a Littrow mounting reflection type diffraction grating 3. Between the reflection type diffraction grating 3 and the laser chamber 1, a slit 4 and a beam diameter-enlarging prism system 5 comprising a plurality (3 in the figure) of prisms are placed. The reflection type diffraction grating 3, the beam diameter-enlarging prism system 5 and the slit 4 constitute a bandwidth-narrowing optical system. It should be noted that a window 6 is provided in an optical path in the laser chamber 1, and another slit 4' is placed between the laser chamber 1 and the output mirror 2.

The Littrow mounting reflection type diffraction grating 3 is arranged such that the reflection type diffraction grating 3 is tilted with respect to incident light, and the angle of oblique incidence is equal to the angle of predetermined order of diffraction. In this arrangement, the angle formed between the line normal to the surface of the reflection type diffraction grating 3 and the axis of light incident on the surface is referred to as the "Littrow angle", and the incidence-side surface of each grating groove is referred to as the "blaze surface". Further, the angle formed-between the line normal to the blaze surface and the line normal to the surface of the reflection type diffraction grating 3 is referred to as the "blaze angle". Usually, the Littrow angle and the blaze angle coincide with each other because the reflection type diffraction grating 3 is arranged so that incident light impinges normally on the blaze surface.

Figure 2:
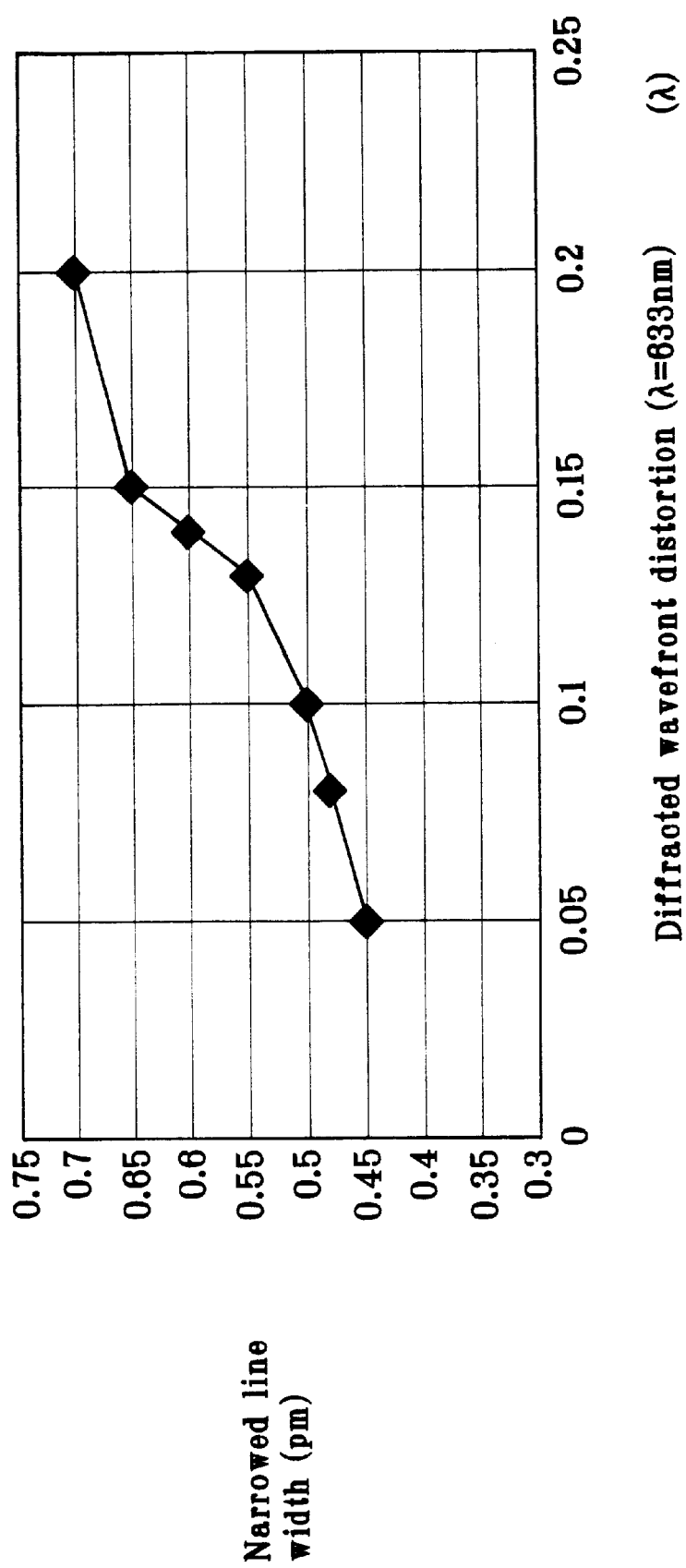
FIG. 2 is a diagram showing the results of measurement of the relationship between diffracted wavefront distortion induced by a reflection type diffraction grating in Littrow mounting and the narrowed line width in an ArF excimer laser apparatus using the reflection type diffraction grating.

FIG. 2 is a diagram showing the results of measurement of the relationship between diffracted wavefront distortion induced by the reflection type diffraction grating 3 in Littrow mounting and the narrowed line width in an ArF excimer laser apparatus using the reflection type diffraction grating 3 as a component of a bandwidth-narrowing optical system.

Figure 3:
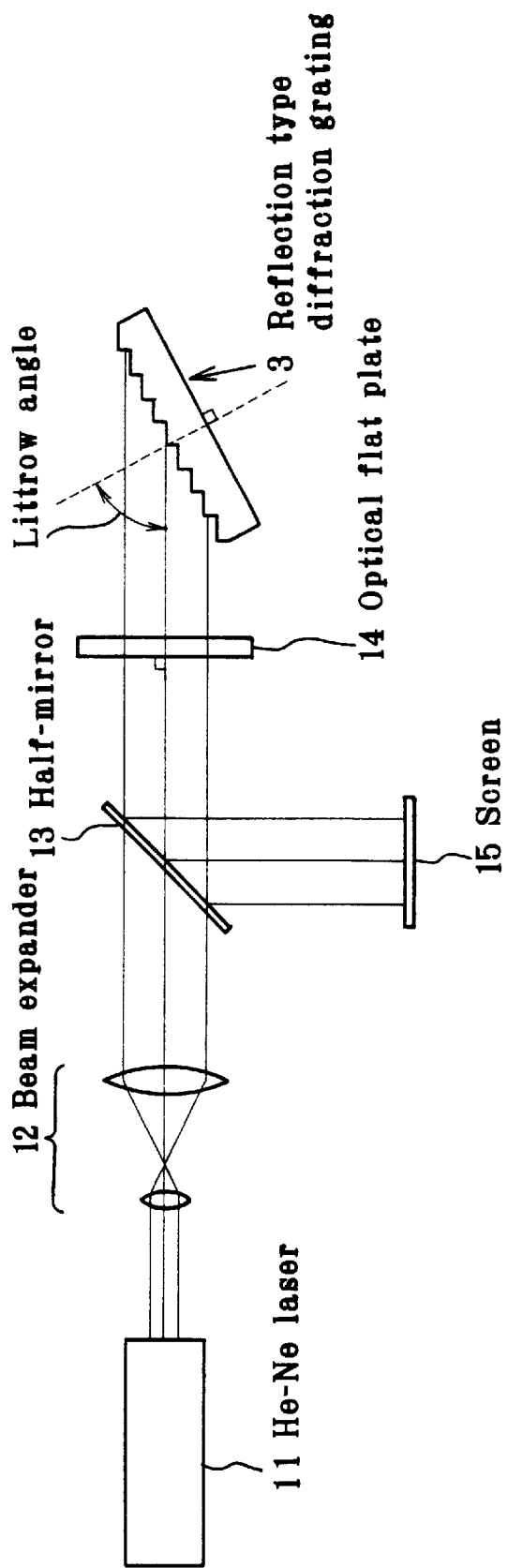
FIG. 3 is a diagram showing the setup of a measuring system for measuring diffracted wavefront distortion.

In this case, diffracted wavefront distortion is measured by a setup using an interferometer (e.g. interferometer system GPI-XP, manufactured by Zygo) as shown in FIG. 3. In FIG. 3, light of wavelength 633 nm from a He—Ne laser 11 is passed through a beam expander 12 to enlarge the beam diameter. Light passing through a half-mirror 13 is incident on an optical flat plate (reference plane) 14 disposed perpendicular to the axis of incident light. A part of the incident light is reflected by the flat surface. Light passing through the optical flat plate 14 is incident on the Littrow mounting reflection type diffraction grating 3 and diffracted in the opposite direction. The wavefront reflected from the optical flat plate 14 and the wavefront diffracted from the reflection type diffraction grating 3 are reflected by the half-mirror 13 and caused to interfere with each other at a screen 15. Thus, distortion of the wavefront diffracted from the reflection type diffraction grating 3 is measured. It should be noted that the wavefront distortion is the difference between the maximum value of the amount of convex displacement of the wavefront with respect to the reference plane and the maximum value of the amount of concave displacement of the wavefront with respect to the reference plane within the plane of the reflection type diffraction grating 3. The difference is expressed as a distance in terms of wavelength.

As will be clear from FIG. 2, the line width of laser light output from the ArF excimer laser apparatus will not become less than 0.5 pm unless the wavefront distortion of diffracted light from the reflection type diffraction grating 3 is less than $0.1\lambda$ $(=\lambda/10)$.

Accordingly, the first principle of the present invention is to use, as the Littrow mounting reflection type diffraction grating 3 constituting the bandwidth-narrowing optical system, a reflection type diffraction grating in which diffracted wavefront distortion (a measured value for He—Ne laser light) within the laser irradiation area of the reflection type diffraction grating in Littrow mounting is less than $\lambda/10$, where $\lambda$ is a measuring wavelength.

The use of such a reflection type diffraction grating 3 makes it possible to obtain laser light having a line width of 0.5 pm or less, which is required for a laser light source for semiconductor lithography.

Figure 4:
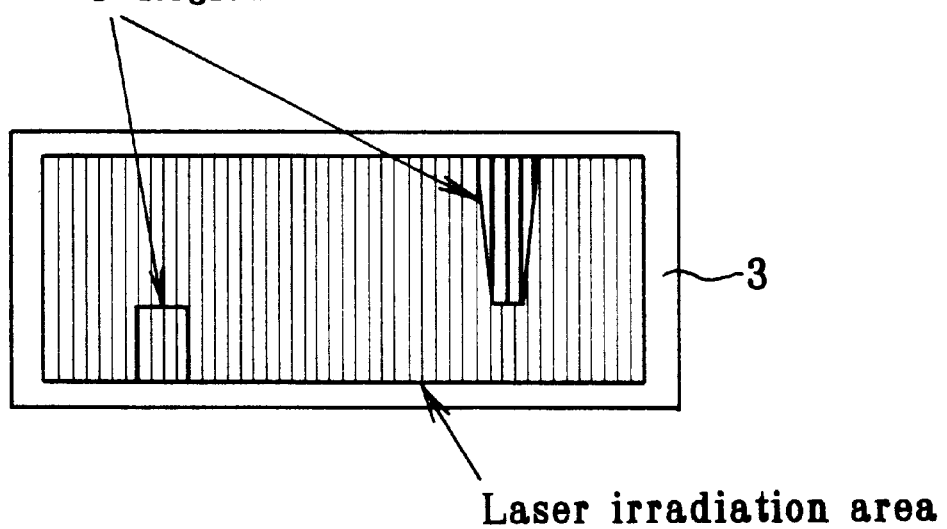
FIG. 4 is a diagram showing wavefront distortion of a reflection type diffraction grating as seen in the direction of incidence of laser light.
Figure 5:
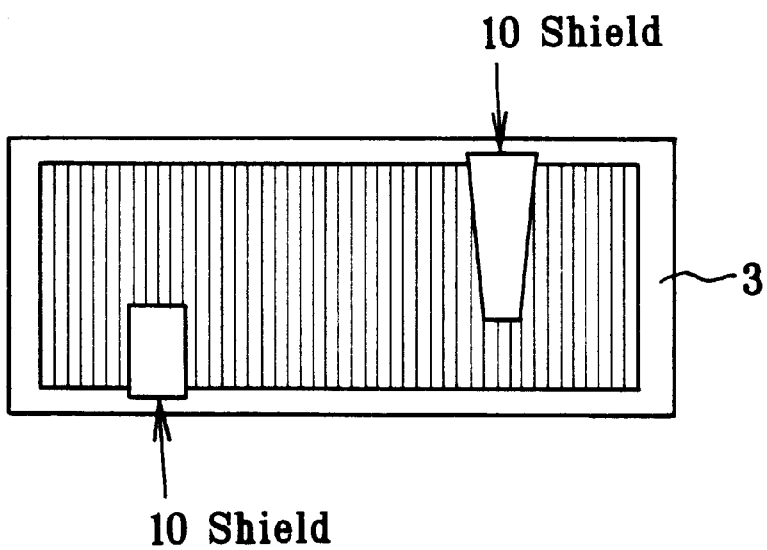
FIG. 5 is a diagram showing the principle of an embodiment of the present invention.
Figure 6:
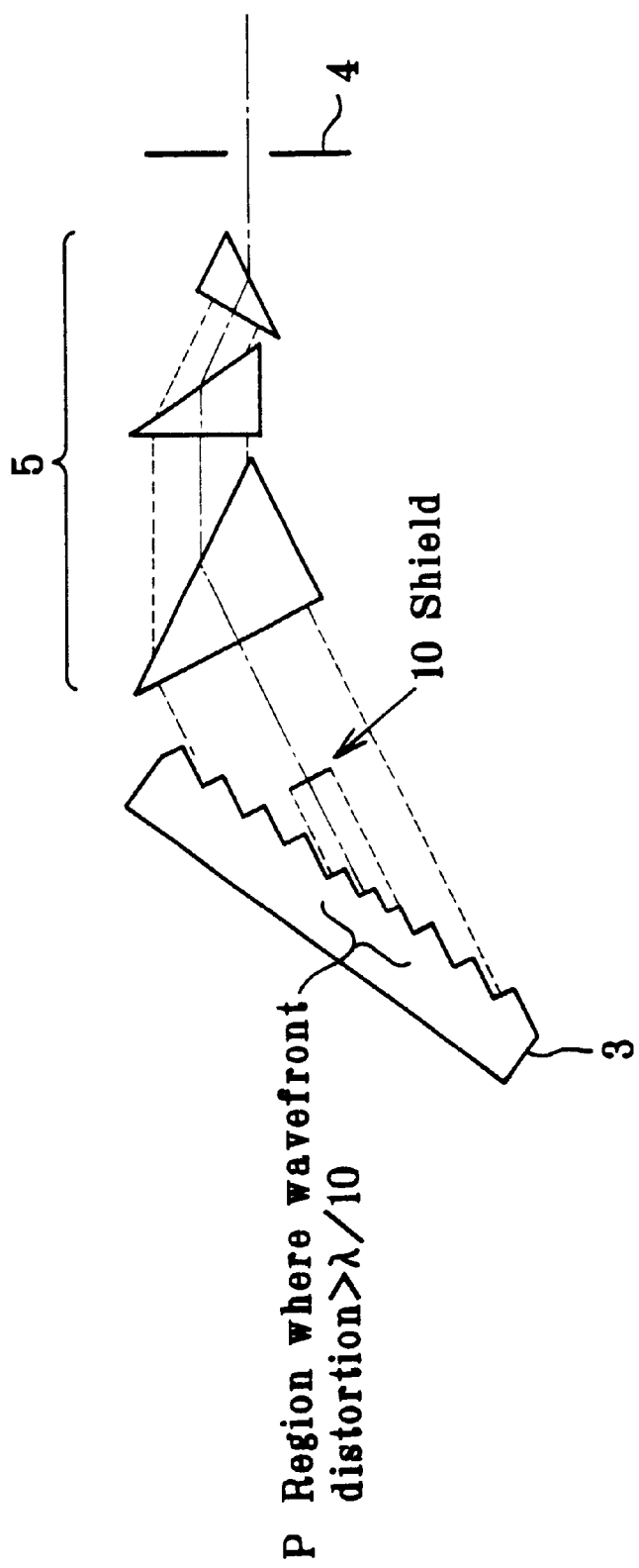
FIG. 6 is a diagram showing the arrangement of an essential part of an excimer laser apparatus according to an embodiment to which the principle shown in FIG. 5 is applied.

FIG. 4 is a diagram showing wavefront distortion of a reflection type diffraction grating 3 as seen in the direction of incidence of laser light, measured with a setup as shown in FIG. 3. In FIG. 4, wavefront distortion (a measured value for He—Ne laser light) is larger than $\lambda/10$ at specific regional portions P within the laser irradiation area of the reflection type diffraction grating 3. In this case, as shown in FIG. 5, a shield 10 having a size corresponding to, each of the regional portions P where the wavefront distortion is larger than $\lambda/10$ should be placed between the reflection type diffraction grating 3 and the slit 4 to prevent laser light from being incident on the regional portions P. FIG. 6 shows an example of such an arrangement. In the case of FIG. 6, a shield 10 having a size corresponding to a regional portion P is placed between the reflection type diffraction grating 3 and the beam diameter-enlarging prism system 5 at a position corresponding to the regional portion P. It is also possible to place the shield 10 within the beam diameter-enlarging prism system 5 or between the beam diameter-enlarging prism system 5 and the slit 4. Furthermore, regional portions P of the reflection type diffraction grating 3 where the wavefront distortion is larger than $\lambda/10$ may be coated directly with an ultraviolet-screening and absorbing paint to shield them. It should be noted that even if such a shield 10 is placed in the laser apparatus, there is no possibility of a hole appearing in the section of the output laser beam in the case of an excimer laser apparatus such as that shown in FIG. 1 because the diameter of the output laser beam is enlarged and the laser oscillation operation is multimode oscillation with an extremely large number of modes.

Figure 7:
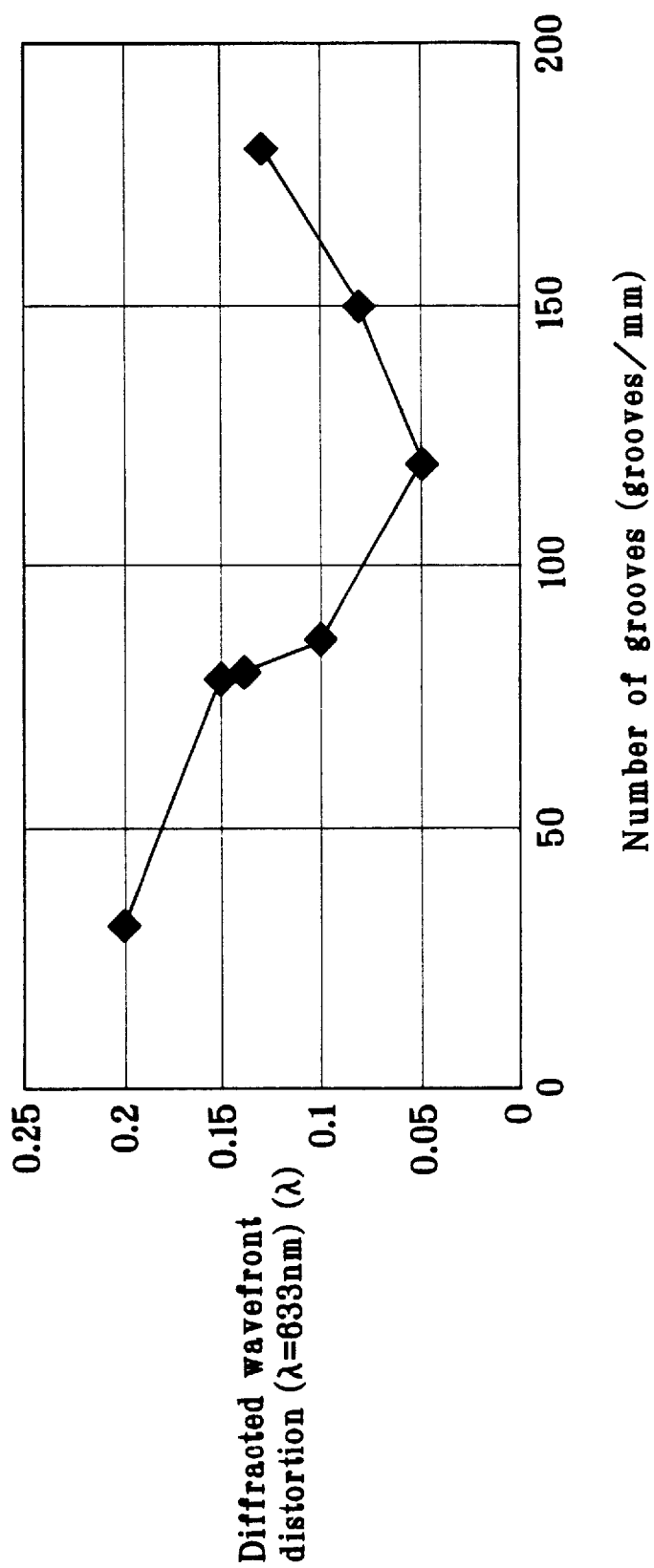
FIG. 7 is a diagram showing the relationship between the number of grooves of an actual, commercially available Littrow mounting reflection type diffraction grating and diffracted wavefront distortion.

Next, FIG. 7 is a plot showing the relationship between the number of grooves (grooves/millimeter) of an actual, commercially available Littrow mounting reflection type diffraction grating and diffracted wavefront distortion (a measured value for He—Ne laser light). As will be clear from the diagram, diffracted wavefront distortion assumes bottom values when the number of grooves per millimeter is in the range of from 80 to 150, and it becomes larger than $\lambda/10$ as the number of grooves becomes either smaller or larger than the above range. The reason for this is that as the number of grooves becomes smaller than the above range, the groove pitch variation-leveling action depending on the number of grooves decreases, and it becomes difficult to reduce the diffracted wavefront distortion to $\lambda/10$ or less from the viewpoint of actual manufacturing accuracy. Conversely, if the number of grooves becomes larger than the above-described range, the groove pitch becomes excessively fine, and the size of the blaze surface becomes nearly equal to the wavelength. Consequently, the influence of the manufacturing accuracy on the diffracted wavefront distortion is sharply manifested. Furthermore, it becomes likely that laser light will occasionally fail to be incident on the blaze surface owing to the in-plane distortion of the reflection type diffraction grating. For these reasons, the diffracted wavefront distortion becomes unfavorably large. Accordingly, it is desirable that the number of grooves of the reflection type diffraction grating 3 used in the narrow-band excimer laser apparatus according to the present invention should be in the range of from 80 to 150 per millimeter.

Assuming that the waveform presents a Gaussian distribution, the narrowed spectral line width $\Delta\lambda$ in an excimer laser apparatus having a bandwidth-narrowing optical system using a Littrow mounting reflection type diffraction grating 3 as in the present invention is given by $$(\Delta\lambda)^2=(\Delta\lambda_1)^2+(\Delta\lambda_2)^2 \qquad (1)$$

In the above equation (1), $\Delta\lambda_1$ is a component depending on the angle of incidence on the reflection type diffraction grating 3 (Littrow angle). The component $\Delta\lambda_1$ decreases as the angle of incidence increases, and is determined by resolution $d\lambda/d\theta$ ($\theta$ is the angle of incidence) obtained from the diffraction equation. Further, $\Delta\lambda_2$ is a component depending on wavefront distortion. The component $\Delta\lambda_2$ corresponds to the fact that resolution decreases as wavefront distortion increases.

Figure 8:
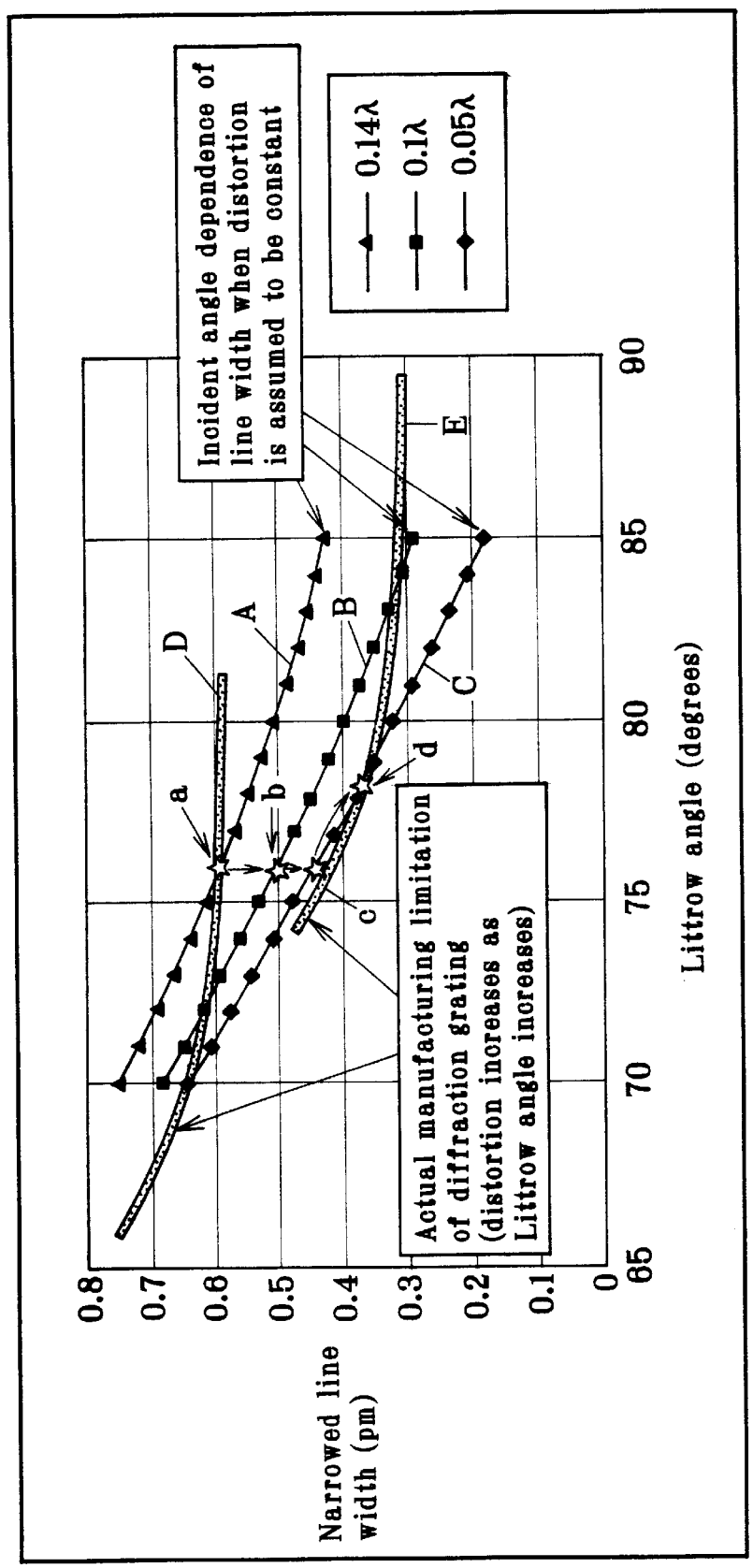
FIG. 8 is a diagram showing the theoretical and actual values of the narrowed spectral line width in the excimer laser apparatus to which the present invention is directed.

FIG. 8 shows the theoretical values based on the above equation (1) and the actual values. In the diagram, curve A shows changes in the narrowed line width with respect to the Littrow angle obtained from the above equation (1) on the assumption that wavefront distortion is constant regardless of the change in Littrow angle with regard to a reflection type diffraction grating in which the measured value of wavefront distortion at a Littrow angle of 76° is 0.14$\lambda$. In contrast, curve D is based on the actual limitations in the manufacture of reflection type diffraction gratings. As the Littrow angle increases, the size of the blaze surface decreases, and the influence of the manufacturing accuracy on the diffracted wavefront distortion is manifested more sharply. Consequently, the wavefront distortion term becomes large. Therefore, curve D based on the actual manufacturing limitations reaches saturation, i.e. a line width of about 0.6 pm, at a Littrow angle of about 75°. The line width will not become narrower than the limit. Point a on curve D indicates the value in the conventional excimer laser apparatus. Therefore, there is no sense in increasing the Littrow angle in excess of 76°.

In contrast, curve B in FIG. 8 is a curve similar to curve A, which is obtained with the above-described excimer laser apparatus according to the present invention that uses a reflection type diffraction grating 3 in which the wavefront distortion is $\lambda/10$, or a reflection type diffraction grating 3 in which a region where the wavefront distortion is more than $\lambda/10$ is shielded. Point b on curve B indicates a narrowed line width at a Littrow angle of 76°. Thus, a line width of 0.5 pm is obtained.

Curve C in FIG. 8 is a curve similar to curve A, which is obtained with the above-described excimer laser apparatus according to the present invention that uses a reflection type diffraction grating 3 in which the wavefront distortion is $\lambda/20$, or a reflection type diffraction grating 3 in which a region where the wavefront distortion is more than $\lambda/20$ is shielded. Point c on curve C indicates a narrowed line width at a Littrow angle of 76°. Thus, a line width of about 0.45 pm is obtained. In this case, if the Littrow angle is increased to about 78° from 76°, the line width is narrowed down to 0.4 pm or less as shown by point d. However, in this case also, the narrowed line width reaches saturation at about 0.3 pm owing to the actual manufacturing limitations, as shown by curve E. Therefore, it is worth increasing the Littrow angle in excess of 76°, which is the conventional Littrow angle. However, there is a little sense in increasing the Littrow angle in excess of about 80°. In other words, it is worth increasing the blaze angle of the reflection type diffraction grating in excess of 76°, but there is a little sense in increasing the blaze angle in excess of about 80°.

Although the narrow-band excimer laser apparatus according to the present invention has been described on the basis of the principle and embodiments thereof, it should be noted that the present invention is not limited to the foregoing embodiments but can be modified in a variety of ways.

As will be clear from the foregoing description, in the narrow-band excimer laser apparatus according to the present invention, diffracted wavefront distortion within the laser irradiation area of the reflection type diffraction grating in Littrow mounting is not more than $\lambda/10$. Alternatively, a light-blocking device is placed between the reflection type diffraction grating and the slit to prevent laser light from being applied to a portion of the laser irradiation area of the reflection type diffraction grating at which diffracted wavefront distortion is more than $\lambda/10$. Accordingly, the line width of generated laser light can be made extremely narrow, i.e. 0.5 pm or less. Thus, it is possible to realize a narrow-band excimer laser apparatus satisfactorily usable as a laser light source for semiconductor lithography or the like.

What we claim is:

1. An excimer laser apparatus in which a laser chamber containing therein main discharge electrodes for excitation is interposed between an output mirror and a bandwidth-narrowing optical system, wherein:

said bandwidth-narrowing optical system comprises a Littrow mounting reflection type diffraction grating, a beam diameter-enlarging optical system positioned on an entrance side of said reflection type diffraction grating, and a slit located at an entrance side of said-beam diameter-enlarging optical system, and diffracted wavefront distortion, as measured by He—Ne laser light, within a laser light irradiation area of said reflection type diffraction grating in Littrow mounting is not more than $\lambda/10$, wherein $\lambda$ is a wavelength of the He—Ne laser light.

2. An excimer laser apparatus in which a laser chamber containing therein main discharge electrodes for excitation is interposed between an output mirror and a bandwidth-narrowing optical system, wherein:

said bandwidth-narrowing optical system comprises a Littrow mounting reflection type diffraction grating, a beam diameter-enlarging optical system positioned on an entrance side of said reflection type diffraction grating, and a slit located on an entrance side of said beam diameter-enlarging optical system, and light-blocking means is positioned between said reflection type diffraction grating and said slit to prevent laser light from being applied to a portion of a laser irradiation area of said reflection type diffraction grating, at which diffracted wavefront distortion, as measured by He—Ne laser light, within a laser light irradiation area of said reflection type diffraction grating in Littrow mounting is not more than $\lambda/10$, where $\lambda$ is a measuring wavelenth.

3. A narrow-band excimer laser apparatus according to claim 1 or 2, wherein the number of grooves of said reflection type diffraction-grating is in a range of from 80 to 150 per millimeter.

4. A narrow-band excimer laser apparatus according to claim 3, wherein a blaze angle of said reflection type diffraction grating is not less than 76°.

5. A narrow-band excimer laser apparatus according to claim 1 or 2, wherein a blaze angle of said reflection type diffraction grating is not less than 76°.

* * * * *